Feb. 7, 1961 L. PRESSER 2,970,337
WINDOW CLEANING DEVICE
Original Filed March 13, 1956 2 Sheets-Sheet 2

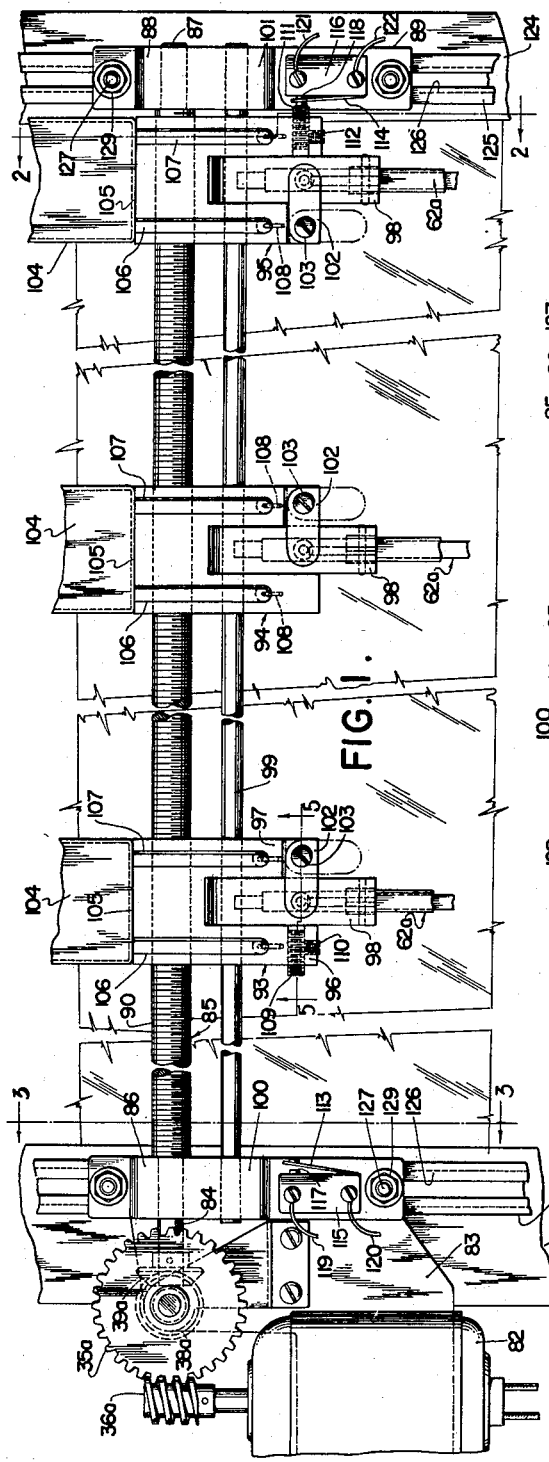
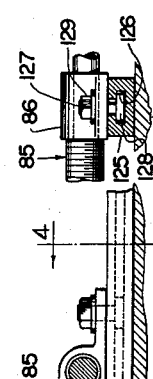
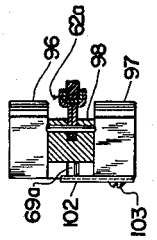
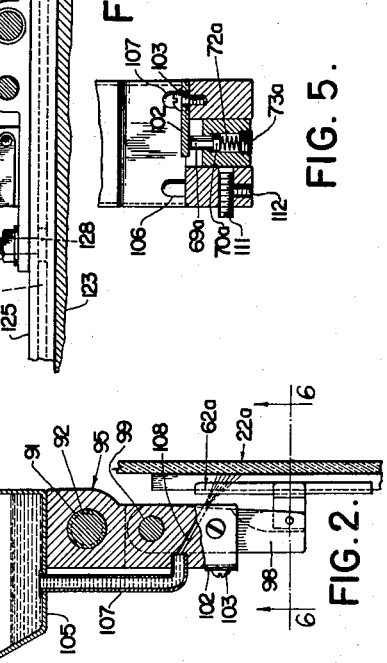

INVENTOR
LEISER PRESSER.
BY
ATTORNEY

# United States Patent Office 2,970,337
Patented Feb. 7, 1961

2,970,337
WINDOW CLEANING DEVICE

Leiser Presser, 1367 46th St., Brooklyn, N.Y.

Original application Mar. 13, 1956, Ser. No. 571,169, now Patent No. 2,885,708, dated May 12, 1959. Divided and this application Mar. 13, 1959, Ser. No. 799,301

4 Claims. (Cl. 15—250.04)

This invention relates to window cleaners, this being a division of my application filed March 13, 1956, Serial No. 571,169 and which matured into Patent No. 2,885,708.

It is an object of this invention to present a device, preferably of the type that is connected to a source of motive power, and which will clean several sections of a window with which it is operatively associated. And in this aspect of my invention it is my object to provide a plurality of window cleaning members simultaneously moving along a plurality of predetermined paths, an objective accomplished by a novel arrangement of single guiding means operatively associated with all of said cleaning members, the said guiding means providing a plurality of predetermined paths in parallel relation to the window. In one aspect of my invention the cleaning elements are adapted to clean laterally adjacent window sections, and in another aspect they are adapted to clean vertically adjacent window sections.

Another object of this invention is the provision of water-ejecting means for coaction with the wiper elements. And in this aspect of my invention it is my objective to provide water reservoir means movably associated with the wiper carrier means, so that water will be operatively directed against the window only in the regions of the wiper elements when they are in operative engagement with the window.

Other objects are the provision of novel holding means for the wiper element for maintaining a yieldable pressure against the window being cleaned, retractable supports for the wiper element whereby it may be removed from its operative position for replacement purposes or for permitting access to the window and the opening thereof, and adjustable means for varying the position of the device on a window.

Other objects, features and advantages will appear from the drawings and the description hereinafter given.

Referring to the drawings,

Figure 1 is a fragmentary front view of a form of my invention showing three wiper elements and associated parts in operative position.

Figure 2 is a fragmentary section of Fig. 1 taken substantially along line 2—2.

Figure 3 is a fragmentary section of Fig. 1 taken substantially along line 3—3.

Figure 4 is a section of Fig. 3 taken along line 4—4.

Figure 5 is a section of Fig. 1 taken along line 5—5.

Figure 6 is a section of Fig. 2 taken along line 6—6.

Figure 7:
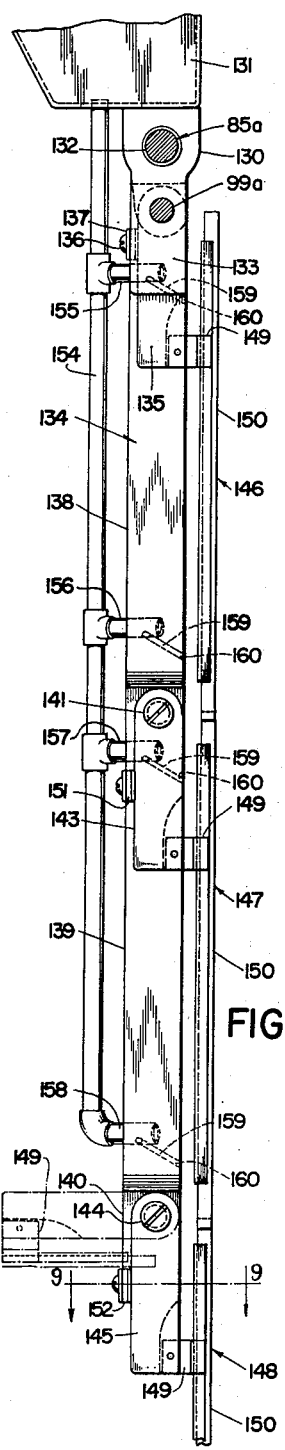
Figure 7 is a vertical sectional elevation of another form of my invention, the section being taken along line 7—7 of Fig. 8, one of the wiper-holder members being shown by dot-dash lines in its retracted position.

In the forms of my invention illustrated in the drawings, several wiper-carrier means are mounted on and supported by a single rotatably mounted carrier rod, this being in contradistinction to the embodiment illustrated in Figs. 1 to 6 of my above-mentioned parent application in which the carrier rod is adapted to support only a single wiper carrier. The carrier rod is preferably provided with theaded means interengaged with said carrier means, whereby upon an operative rotation of the rod the carrier means will be moved along said rod to effect an operative wiping action against the window. There is also a single guide member adjacent and in parallel relation to said carrier rod, a component of said carrier means being slidably mounted over said guide member, whereby all the wiper elements are maintained in operative position against the window, and are all movable along a path determined by the position of said single guide member. The various embodiments of my invention also include retractable holding means for the wiper elements, each of said latter means being rotatably mounted over a rod-like guide member.

In the form of my invention illustrated in Figs. 1 to 6, a reversible motor 82 is operatively mounted on the base 83. The said motor is connected by gears 36a, 35a, 38a and 39a in known manner to the terminal portion 84 of carrier rod 85, said terminal portion 84 being rotatably supported by the bearing 86. At the opposite end of carrier rod 85 is the terminal shaft 87 rotatably supported by the bearing portion 88 mounted upon base 89.

The said carrier rod 85 contains a conventional carrier thread 90 thereon; and in operative engagement with said thread 90 are the respective threaded portions 91 of the bored walls 92 of wiper-carrier members 93, 94 and 95. The said carrier members are mounted in spaced relation, and are so positioned that upon the operative rotation of carrier rod 85, they will move in unison along portions of the longitudinal extent of said rod 85. Each of said carrier members has spaced depending legs 96 and 97 between which is mounted a wiper arm 98, the latter having a central bore therethrough through which extends the guide rod 99 operatively supported by structures 100 and 101 mounted, respectively, on said bases 83 and 89. Each of said arms 98 is swingably mounted over said rod 99, and is maintained in its operative position by a latch member 102 pivotally supported by a fastener 103 on one of said depending legs of the corresponding carrier member. As illustrated in Fig. 5, showing the latch in its closed position, the pin 69a is maintained in frictional engagement with the latch 102 by the action of spring 72a against the head 70a of said pin, the adjusting screw 73a maintaining the desired tension in said spring to keep the latch 102 in its operative position. By operatively swinging the latch 102 into its retracted position (as shown by the dot-dash position of the latch on carrier 93, Fig. 1) the coacting wiper arm 98 can be retracted in the manner aforesaid. The wiper element 62a is pivotally supported upon arm 98 in the manner described in my said parent application.

This particular embodiment shows water reservoirs 104 mounted on each of said carrier members 93, 94 and 95. Extending downwardly from the base 105 of each of said reservoirs are two pipes 106 and 107, these extending into the legs 96 and 97 of the respective carriers. In the arrangement illustrated, inclined ducts 108 communicate with the terminals of each of said pipes 106 and 107, the rear outlet of each of said ducts facing the window 22a, as illustrated in Fig. 2.

It will further be noted that carrier 93 has an outwardly protruding stud 109 maintained in position by the locking screw 110; and carrier 95 has a similar but oppositely positioned outwardly extending stud 111 maintained in position by the screw 112. These studs are positioned for operative engagement with the respective contact arms 113 and 114 of the respective microswitches 115 and 116. As shown in Fig. 1, stud 111 is in engagement with arm 114, the latter having been brought into engagement with contact 118 of the microswitch 116, The said stud 109 is also adapted for engagement with arm 113, for bringing the arm into electrical engagement with the contact 117 on microswitch 115. Electrical conductors 119, 120 and 121, 122 are electrically connected to the said reversible motor 82 in known manner. The arrangement is such that when the circuit is operatively closed through microswitch 115, the motor 82 will operate in one direction; and when the circuit is operatively closed through microswitch 116, the motor 82 will operate in the opposite direction, all in well-known manner. No detailed description of the circuit connecting the respective microswitches and reversible motor 82 is herein given, since such construction is of conventional nature and is well known to those skilled in the art, and further because such a detailed description will not further aid in an understanding of the present invention.

From the above description it is apparent that when the motor 82 operates in one direction, the carrier rod 85 will operate in a corresponding direction, whereupon the three wiper-carrier members 93, 94 and 95 will move in unison in one direction. This continues until one of the end carriers, such as carrier 95, reaches an end position, such as is illustrated in Fig. 1. When the microswitch 116 is operatively actuated, the circuit is closed through microswitch 116, causing a reversing of motor 82, thereby also causing a reversed movement of carrier rod 85 and the three carriers operatively mounted upon it. Similarly, when the carrier 93 reaches the extreme left position, the microswitch 115 will be actuated, in the manner described, to close the circuit through microswitch 115 and thereby cause a change of direction of motor 82.

It is thus apparent that as long as the motor 82 continuously operates, there will be a continuous window-cleaning operation of the three carrier members; the action being of reciprocating nature, for the reasons hereinabove given; and inasmuch as there are a plurality of wiper members, it is evident that the cleaning action can be very rapid.

This embodiment is further provided with adjustable means to enable the entire unit to be moved vertically along a window, so as to enable different sections of the window to be cleaned. The lateral window frames 123 and 124 each contains a track 125, each having therein a longitudinal T-slot 126. The respective bases 83 and 89 on opposite sides of the window contain bolts 127 the heads 128 of which are slidably positioned within said T-slots. To adjustably move the unit to a new position, the nuts 129 are loosened, whereupon the entire unit can be slidably moved to a desired new position; whereafter the nuts 129 are tightened to secure the unit in such position.

Figure 8:
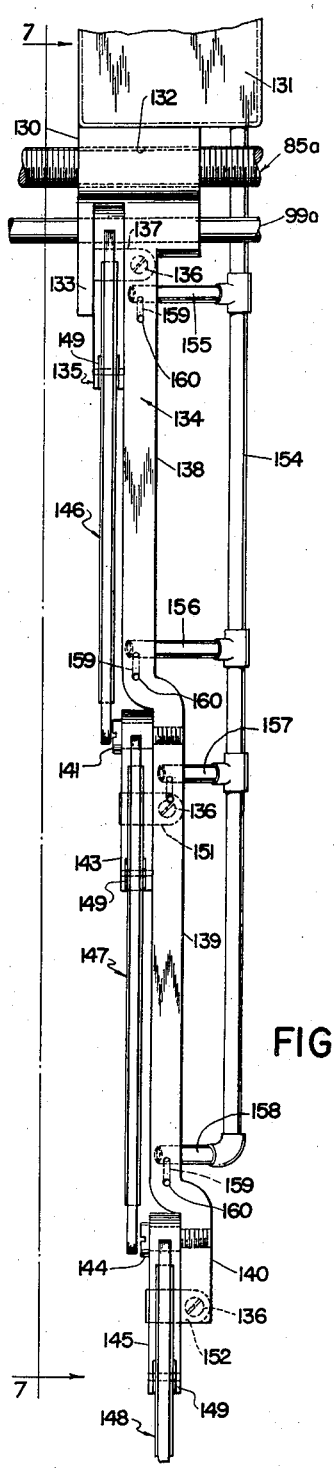
Figure 8 is a rear elevation of Fig. 7.
Figure 9:
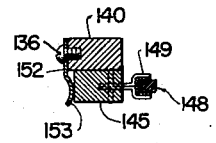
Figure 9 is a section of Fig. 7 taken along line 9—9.

In the form of my invention illustrated in Figs. 7 to 9, a carrier rod 85a and guide rod 99a are employed, these being substantially analagous to the correspondingly numbered components of Figs. 1 to 6. Mounted on the upper carrier member 130 is the reservoir 131, supplying water into a plurality of carrier members, in a manner to be hereinafter described. Carrier member 130 contains the threaded bored portion 132, whereby the operative rotation of carrier rod 85a will cause an operative movement of carrier member 130 and its associated parts substantially in the manner above described.

The said carrier member 130 contains a short depending leg 133, and substantially parallel and in spaced relation thereto the elongated carrier bar 134. Disposed between leg 133 and bar 134 is the upper carrier arm 135 swingably mounted upon guide rod 99a. Pivotally mounted on carrier bar 134 at 136 is the latch 137, preventing a retraction of said arm 135, in the manner aforesaid.

The said carrier bar 134 contains the upper portion 138, the intermediate portion 139 and the bottom-most portion 140, these being progressively offset with respect to each other. Extending through and supported by the top of intermediate portion 139 is the stud 141 upon the shank of which the intermediate wiper arm 143 is rotatably supported. Extending through and supported by the said bottom-most portion 140 is the stud 144 upon the shank of which is rotatably mounted the wiper arm 145. Wiper elements 146, 147 and 148 are pivotally mounted upon their respective carrier arms 135, 143 and 145 by the brackets 149, in the manner aforesaid. The rear edges 150 of all said wiper elements are in one plane, so that they may simultaneously engage an adjacent window during the operative movement of the carrier member 130 in the longitudinal direction of said carrier rod 85a. The said latch 137, as well as the latches 151 and 152, are retractable, to permit the respective carrier arms 135, 143 and 145 to be operatively retracted, together with the associated wiper elements 146, 147 and 148. It will be noted that the latter are in overlapping relation, so as to assure that all portions of the window are operatively engaged by the wipers with no spaces therebetween. Because of the above-described offset relationship of portions 138, 139 and 140 of the carrier bar 134, all three wiper elements can be operatively retracted without interference.

Fig. 9 shows the latch construction employed in this embodiment of my invention. The latch 152 of spring material, has an inwardly curved portion 153 in engagement with the corresponding wiper arm 145, thereby yieldably holding it in position against the window.

Extending down from the base of reservoir 131 is the main water feed pipe 154, having branches 155, 156, 157 and 158 leading into spaced portions of carrier bar 134. The said branches communicate with channels 159 which terminate in outlets 160 adjacent the wiper elements. In this manner a plurality of sprays can be directed against the window during the operative wiping action of this device.

With the last-described embodiment of my invention it is apparent that vertically aligned sections of a window can be simultaneously cleaned by a plurality of coacting wiper elements.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a device for cleaning a window, a plurality of wiper elements, a plurality of carrier members, a rotatable threaded carrier rod, means to rotate said rod, an elongated guide rod parallel to said carrier rod, said carrier members having a plurality of arms each swingably and slidably mounted on said guide rod and each supporting one of said wiper elements, said carrier members having two open-ended apertured portions, said two rods extending through said two apertured portions, respectively, said carrier members being in threaded engagement with said carrier rod and in slidable engagement with said guide rod, whereby the operative rotation of said carrier rod will cause an operative movement of said carrier members with the said arms and wiper elements in the direction of the longitudinal extent of said guide rod, means to hold said arms in operative positions at which the respective wiper elements are in engagement with said window, water reservoir means supported by and movable with said carrier means, and conduit means communicating with and extending from said reservoir means to the respective regions of said wiper elements.

2. In a window-cleaning device, a plurality of wiper elements, a plurality of carrier members having a plurality of arms each supporting one of said wiper elements, supporting said respective elements, a rotatable threaded carrier rod, means to rotate said rod, elongated guide means parallel to said rod, said carrier members each having two open-ended apertured portions extending therethrough, each of said arms being swingably and slidably mounted on said guide means, means to hold said arms in operative positions at which the respective wiper elements are in engagement with said window, water conduit means, apertured spray means communicating with said conduit means facing generally rearwardly and disposed above said wiper elements, said rod extending through one of said apertured portions and said guide means extending through the other of said apertured portions, said carrier members each being in threaded engagement with said carrier rod and in slidable engagement with said guide means, whereby the operative rotation of said carrier rod will cause simultaneous operative movements of said carrier members and the respective wiper elements supported thereby in the direction of the longitudinal extent of said rod.

3. In a window-cleaning device, a wiper element, carrier means supporting said element, a rotatable threaded carrier rod in threaded engagement with said carrier means, means to rotate said rod, elongated guide means parallel to said rod and in slidable engagement with said carrier means, whereby the operative rotation of said carrier rod will cause an operative movement of said carrier means and said wiper element supported thereby in the direction of the longitudinal extent of said rod, said carrier means having a bar extending downwardly therefrom, second carrier means supported by said bar, said carrier means having pivotally mounted arms supporting said respective wiper elements, and spring means urging said arms rearwardly.

4. In a window-cleaning device, the combination according to claim 3, apertured portions in said bar with openings facing generally rearwardly, and water supply conduits operatively connected to said apertured portions.

References Cited in the file of this patent

UNITED STATES PATENTS

| | | |
|---|---|---|
| 1,369,817 | Klatt | Mar. 1, 1921 |
| 1,484,251 | Bennan | Feb. 19, 1924 |
| 1,514,340 | Rise et al. | Nov. 4, 1924 |
| 1,644,545 | Robertson | Oct. 4, 1927 |
| 1,789,217 | Cherry | Jan. 13, 1931 |
| 1,793,354 | Bornstein | Feb. 17, 1931 |
| 1,982,624 | Barker | Dec. 4, 1934 |
| 2,644,187 | Lacy | July 7, 1953 |

FOREIGN PATENTS

| | | |
|---|---|---|
| 664,938 | France | Apr. 29, 1929 |